(12) United States Patent
Fukugami et al.

(10) Patent No.: US 8,628,638 B2
(45) Date of Patent: Jan. 14, 2014

(54) LAMINATE

(75) Inventors: Miki Fukugami, Tokyo (JP); Toshiya Ishii, Tokyo (JP); Tomokazu Murase, Tokyo (JP); Noritada Nakanishi, Tokyo (JP); Ryukichi Matsuo, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 79 days.

(21) Appl. No.: 13/067,105

(22) Filed: May 9, 2011

(65) Prior Publication Data

US 2011/0212275 A1 Sep. 1, 2011

Related U.S. Application Data (63) Continuation of application No. 12/382,065, filed on Mar. 6, 2009, now abandoned, which is a continuation of application No. PCT/JP2007/067017, filed on Aug. 31, 2007.

(30) Foreign Application Priority Data

Sep. 8, 2006 (JP) .................................. 2006-244513
Mar. 30, 2007 (JP) .................................. 2007-094833

(51) Int. Cl.
*B32B 37/15* (2006.01)

(52) U.S. Cl.
USPC .................. 156/272.2; 156/324.4; 428/448; 428/480; 428/689; 427/533

(58) Field of Classification Search
USPC ......... 156/272.2, 324.4; 428/435, 447, 477.7, 428/448, 480, 689; 427/533
See application file for complete search history.

(56) References Cited

U.S. PATENT DOCUMENTS

| 6,512,562 | B1 * | 1/2003 | Kobayashi et al. | 349/122 |
| 2002/0197480 | A1 * | 12/2002 | Umekawa et al. | 428/413 |
| 2004/0115445 | A1 * | 6/2004 | Sasaki et al. | 428/451 |
| 2008/0262179 | A1 * | 10/2008 | Nakamura et al. | 526/241 |

FOREIGN PATENT DOCUMENTS

| JP | 60-6459 | 1/1985 |
| JP | 61-280930 | 12/1986 |
| JP | 62-214941 | 9/1987 |
| JP | 63-242541 | 10/1988 |
| JP | 3-114829 | 5/1991 |
| JP | 9-156043 | 6/1997 |
| JP | 1998-249996 | 9/1998 |
| JP | 2895917 | 5/1999 |
| JP | 2000-238195 | 9/2000 |
| JP | 2000-318104 | 11/2000 |

(Continued)

OTHER PUBLICATIONS

U.S. Appl. No. 12/382,065, filed Mar. 6, 2009, Miki Fukugami et al., Toppan Printing Co., Ltd.
International Search Report for International Application No. PCT/JP2007/067017, mailed Dec. 11, 2007.
English Translation of the International Preliminary Report on Patentability issued on Mar. 26, 2009 in corresponding International Patent Application PCT/JP2007/067017.

(Continued)

*Primary Examiner* — Richard Crispino
*Assistant Examiner* — Elizabeth Royston (57) ABSTRACT

A laminate prepared by pretreating at least one side of a substrate of a plastic film by plasma treatment and then directly laminating a thermoplastic resin on a surface treated by pretreatment.

4 Claims, 3 Drawing Sheets

(56) References Cited

FOREIGN PATENT DOCUMENTS

| | | |
|---|---|---|
| JP | 2001-9979 | 1/2001 |
| JP | 2001-322201 | 11/2001 |
| JP | 2002-265652 | 9/2002 |
| JP | 3385663 | 3/2003 |
| JP | 2004-137419 | 5/2004 |
| JP | 2005-68236 | 3/2005 |
| JP | 2005-231039 | 9/2005 |
| JP | 3716006 | 11/2005 |
| JP | 2006-142494 | 6/2006 |
| JP | 2006-142548 | 6/2006 |

OTHER PUBLICATIONS

Office Action mailed from the Unites States Patent and Trademark Office on Aug. 4, 2010 in the related U.S. Appl. No. 12/382,065.
Office Action mailed from the Unites States Patent and Trademark Office on Feb. 9, 2011 in the related U.S. Appl. No. 12/382,065.
Japanese Office Action mailed May 29, 2012 issued in corresponding Japanese Patent Application No. 2008-508417.

* cited by examiner

LAMINATE

CROSS-REFERENCE TO RELATED APPLICATIONS

This application is a continuation of U.S. application Ser. No. 12/382,065, filed Mar. 6, 2009 now abandoned, which is a continuation application of PCT Application No. PCT/JP2007/067017, filed Aug. 31, 2007, which application in turn is based upon and claims the benefit of priority from prior Japanese Patent Applications Nos. 2006-244513, filed Sep. 8, 2006 and No. 2007-094833, filed Mar. 30, 2007, the entire contents of which are incorporated herein by reference.

BACKGROUND

1. Field

The present invention relates to a laminate which exhibits strong interlaminar adhesiveness upon extrusion lamination of a thermoplastic resin onto a plastic film or a substrate including a plastic film. More particularly, the present invention relates to a laminate which exhibits strong adhesiveness by direct extrusion lamination of a thermoplastic resin onto a plastic film or a substrate without applying an anchor coating agent, an adhesive or the like to the plastic film or substrate and without ozonation of the thermoplastic resin at the time of extrusion lamination.

2. Description of the Related Art

A multilayer laminate employed in packaging, for example, is used in a laminate structure of a plastic film, a metallic foil, paper or the like depending on required physical properties. For example, a polyester film is excellent in mechanical properties, dimensional stability and toughness and is thus used as a substrate, and is laminated with a metal foil or an inorganic deposited film to impart gas barrier properties thereto and laminated with a heat-sealing resin layer to impart heat-sealing properties thereto as a packaging material.

The method of producing such a laminated film having a heat-sealing resin layer laminated on a substrate includes dry lamination, wet lamination, extrusion lamination, etc., among which the extrusion lamination advantageous in cost and efficiency is widely used.

In the extrusion lamination, a thermoplastic resin, such as polyethylene, polypropylene and an ethylene-based copolymer, is generally used. However, which such thermoplastic resin is directly laminated onto a plastic film as a substrate, they show poor adhesiveness. Thus, the plastic film is coated in advance with an anchor coating (AC) agent and then extrusion-laminated thereon with the thermoplastic resin.

However, the AC agent is applied after dilution with an organic solvent such as ethyl acetate or toluene as a diluent, and thus generally has problems such as compliance with the regulation by Fire Defense Law, deterioration in working conditions, an increase in production costs due to use of a relatively expensive coating agent, and an odor of a residual organic solvent in final products.

When the thermoplastic resin is extrusion-molded onto both sides of a plastic film as an interlayer, it may be necessary to apply an AC agent in advance on both sides of the plastic film. However, facilities capable of simultaneously applying an AC agent to both sides of the plastic film are special. On the other hand, when usual facilities for extrusion lamination of a thermoplastic resin onto one side of a substrate are used to produce a laminate of such structure, there is a problem that the number of steps should be increased.

As the method of extrusion-laminating a thermoplastic resin on both sides of a substrate without using an AC agent, many attempts have been made. As examples of such methods, there are known a technique of using an ethylene-methacrylic acid copolymer to bond it firmly to an aluminum foil by the action of its acid component and a technique of extruding, onto a deposited substrate, a modified resin having an unsaturated carboxylic acid grafted onto a polypropylene resin to improve adhesion strength. In these methods, however, resins and substrates that can be used are limited, and thus a combination of a general plastic substrate and a thermoplastic resin such as a polyethylene resin is not applicable.

Recently, a method of attaining excellent adhesiveness of a resin to a substrate without an AC agent, by ozonating the surface of its molten resin at the time of extrusion lamination is disclosed as shown in Japanese Patent Nos. 2,895,917, 3,385,663 and 3,716,006. In this method, the adhesiveness of a resin is Improved by blowing ozone to the resin, but ozone has problems such as a very bad smell and toxicity to require attention on safety, and difficulty in confirming whether ozonation is uniformly conducted.

To solve these problems, Jpn. Pat. Appln. KOKAI Publication No. 2000-238195 discloses a method which includes disposing a printed layer on a substrate and then surface-treating the printed layer with UV rays followed by extrusion lamination. However, this method always requires a printed layer and is hardly applicable to a constitution not provided with a printed layer. Even if the steps of lamination with a printed layer and of surface treatment are conducted in line, there is a problem that the steps and costs are increased in the constitution not requiring a printed layer.

A transparent gas barrier film frequently used in recent years as a packaging film has a gas barrier coating layer laminated on one side or both sides of a film. However, when the adhesiveness between the gas barrier coating layer and a resin extrusion-laminated thereon is to be exhibited, there is the same problem as in the case of the substrate described above.

SUMMARY

An object of the present invention is to provide a laminate which attains excellent adhesiveness between a substrate and a thermoplastic resin even if the thermoplastic resin is extrusion-laminated directly on the substrate without applying an anchor coating or an adhesive on the plastic substrate and without ozonation of the thermoplastic resin at the time of extrusion lamination.

The laminate of the present invention is prepared by pre-treating at least one side of a substrate of a plastic film by plasma treatment and then directly extrusion-laminating a thermoplastic resin on a surface treated by pretreatment.

In the present invention, a substrate of a plastic film provided on one side thereof with a deposited layer may be subjected, on the side thereof not provided with the deposited layer, to pretreatment by plasma treatment followed by directly extrusion-laminating a thermoplastic resin on the surface treated by the pretreatment.

In the present invention, the deposited layer may further be provided thereon with a gas barrier coating layer.

In the present invention, when peeling of the substrate and the thermoplastic resin layer is performed while penetrating water, it is preferable that the treated surface of the substrate is peeled through cohesion failure.

The plasma treatment is for example a treatment by reactive ion etching (RIE) which is a treatment with low-temperature plasma where a self-bias value is set to 200 V or more to 2000 V or less and an Ed value defined by Ed=(plasma density)×(treatment time) is set to 100 W·m$^{-2}$·s or more to 10000 W·m$^{-2}$·s or less.

The thermoplastic resin contains one or more resins selected from the group consisting of a low-density polyethylene resin, a high-density polyethylene resin, a medium-density polyethylene resin, an ethylene-vinyl acetate copolymer, an ethylene-α-olefin copolymer, an ethylene-α,β-unsaturated carboxylic acid copolymer and its esterified product or ionic crosslinked product thereof, a polypropylene resin, a propylene-α-olefin copolymer, an acid anhydride-modified polyolefin, and an epoxy-modified polyolefin.

The substrate is formed of, for example, a polyethylene terephthalate film, and when a surface of the polyethylene terephthalate film after pretreatment by reactive ion etching is measured by X-ray photoelectron spectroscopy under conditions of an X-ray source of MgKα and an output power of 100 W, the element ratio (0/C) is preferably 0.49 or less.

The substrate is formed of, for example, a polyethylene terephthalate film, and when a surface of the polyethylene terephthalate film after pretreatment by reactive ion etching is measured by X-ray photoelectron spectroscopy under conditions of an X-ray source of MgKα and an output power of 100 W, the functional group ratio (COO/C—C) as determined by analysis of C1s waveform is preferably 0.33 or less.

The substrate is formed of, for example, a polyethylene terephthalate film, and when a surface of the polyethylene terephthalate film after pretreatment by reactive ion etching is measured by X-ray photoelectron spectroscopy under conditions of an X-ray source of MgKα and an output power of 100 W, the half width of C—C bond as determined by analysis of C1s waveform is preferably 1.340 to 1.560 eV.

The substrate is formed of, for example, a polyamide film, and when a surface of the polyamide film after pretreatment by reactive ion etching is measured by X-ray photoelectron spectroscopy under conditions of an X-ray source of MgKα and an output power of 100 W, the element ratio (O/(C+N)) is preferably 0.2 or more.

The substrate is formed of, for example, a polyamide film, and when a surface of the polyamide film after pretreatment by reactive ion etching is measured by X-ray photoelectron spectroscopy under conditions of an X-ray source of MgKα and an output power of 100 W, the half width of C—C bond as determined by analysis of C1s waveform is preferably 1.380 to 1.560 eV.

The substrate is formed of, for example, a polypropylene film, and when a surface of the polypropylene film after pretreatment by reactive ion etching is measured by X-ray photoelectron spectroscopy under conditions of an X-ray source of MgKα and an output power of 100 W, the element ratio (O/C) is preferably 0.03 to 0.135.

The substrate is formed of, for example, a polypropylene film, and when a surface of the polypropylene film after pretreatment by reactive ion etching is measured by X-ray photoelectron spectroscopy under conditions of an X-ray source of MgKα and an output power of 100 W, the half width of C—C bond as determined by analysis of C1s waveform is preferably 1.320 to 1.600 eV.

In the present invention, a surface of the gas barrier coating layer may be subjected to pretreatment by plasma treatment.

The gas barrier coating layer is for example a gas barrier coating layer containing a water-soluble polymer or a water-soluble polymer and an inorganic compound.

It is preferable that when a surface of the gas barrier coating layer is measured by X-ray photoelectron spectroscopy (XPS), the functional group ratio D (C—OH/C—C) of the carbon-hydroxyl group bond (C—OH) to the carbon-carbon bond (C—C) in a water-soluble polymer is 0.25 or more to 0.87 or less.

The water-soluble polymer is for example polyvinyl alcohol.

The inorganic compound is for example fine particles such as silica particles or hydrolysis products of one or more metal alkoxides.

A deposited layer of inorganic oxide with a thickness of 5 to 100 nm may be disposed between a substrate body and the gas barrier coating layer.

The ratio D/D$^0$ of the functional group ratio D of the gas barrier coating layer after pretreatment to the functional group ratio D$^0$ thereof before pretreatment is preferably 0.30 or more to 0.92 or less.

DESCRIPTION OF EMBODIMENTS

Hereinafter, the best mode of the invention will be described. The plastic film used as a substrate in the present invention is not particularly limited as long as it is generally used as a substrate of a laminate. Examples of such plastic film include a polyester film such as polyethylene terephthalate (PET) and polyethylene naphthalate (PEN), a polyolefin film such as polyethylene and polypropylene, a polystyrene film, a polyamide film, a polycarbonate film, a polyacrylonitrile film and a polyimide film. The substrate may be stretched or unstretched and preferably has mechanical strength and dimensional stability. The surface of the film may be subjected to treatment such as corona treatment. Among the films described above, a polyethylene terephthalate film, a polyamide film and a polypropylene film are preferably used.

On the opposite surface or the side to the side provided with a thermoplastic resin layer of the substrate, a wide variety of known additives and stabilizers, for example, an antistatic agent, a UV protective agent, a plasticizer and a lubricant may be used. This surface may be subjected to treatment such as corona treatment and plasma treatment or provided with an inorganic oxide-deposited layer, a metal-deposited layer, a coating layer and a printed layer. One or more of these layers may be laminated. For example, a deposited layer may be disposed to form a substrate as a gas barrier film. The substrate may be laminated in advance with various plastic films, a metallic foil and a thermoplastic resin layer. The method of lamination in constituting the substrate includes various methods such as dry lamination, extrusion lamination, and the like.

The thickness of the substrate is not particularly limited. As the substrate film, not only a single film but also a film having films different in properties laminated therein may be used in consideration of characteristics as a packaging material. In consideration of processability to form a thermoplastic resin layer by extrusion lamination, the thickness of the substrate is practically preferably in the range of 3 to 200 μm, and particularly preferably in the range of 6 to 30 μm.

In the present invention, the surface of the substrate is subjected to pretreatment by reactive ion etching (RIE) utilizing plasma in order to enhance the adhesion between the substrate and the thermoplastic resin layer. Radicals and ions generated by this treatment with RIE can be utilized to achieve two effects simultaneously, that is, a chemical effect of increasing the amount of functional groups on the surface of the plastic substrate and a physical effect of making the surface of the substrate amorphous by ion etching. A molten thermoplastic resin is extruded onto the substrate thus subjected to pretreatment by RIE, thereby strengthening the adhesion between the substrate and the thermoplastic resin layer. If necessary, both sides of the substrate may be subjected to this pretreatment by RIE.

The treatment conditions of RIE expressed in terms of processing speed, energy level, and the like, are suitably established depending on the type of the substrate, the intended use, characteristics of a discharge device, and the like. In the present invention, however, the substrate is preferably subjected to treatment with low-temperature plasma where the self-bias value of the plasma is 200 V or more to 2000 V or less, and the Ed value defined by Ed=(plasma density)×(treatment time) is 100 $W·m^{-2}·s$ or more to 10000 $W·m^{-2}·s$ or less. Even when the self-bias value and Ed value are slightly lower than the above lower limits, the product can exhibit a certain degree of adhesiveness but is poor in superiority to the untreated product. When the self-bias value and Ed value are higher than the above upper limits, the substrate is subjected to so strong treatment to deteriorate the surface thereof, to cause a reduction in adhesiveness. The plasma gas and its mixing ratio are suitably determined depending on the intended use, the substrate, and device characteristics because the flow rate of an introduced gas is different from the flow rate of its effective fraction.

The thermoplastic resin to be extrusion-laminated onto the pretreated substrate is not particularly limited insofar as it is capable of lamination. Examples of such resin include resins such as a low-density polyethylene resin, a high-density polyethylene resin, a medium-density polyethylene resin, an ethylene-vinyl acetate copolymer, an ethylene-α-olefin copolymer, an ethylene-α,β-unsaturated carboxylic acid copolymer and its esterified product or ionic crosslinked product, a polypropylene resin, a propylene-α-olefin copolymer, an acid anhydride-modified polyolefin, and an epoxy-modified polyolefin. These resins may be used alone or as a blend of two or more thereof.

The thermoplastic resin as described above can be laminated by extrusion lamination onto the substrate. The extrusion temperature in lamination is not particularly limited, and can be suitably determined depending on the resin used. The thickness of the thermoplastic resin layer is preferably 5 to 200 μm, more preferably 5 to 100 μm. When the thickness of the thermoplastic resin layer is less than 5 μm, the thermoplastic resin is hardly uniformly extruded to make the thickness of the layer uneven. When the thickness of the thermoplastic resin layer is more than 200 μm, there is a possibility of reduced physical properties of the laminate, such as reduced heat sealing strength of the thermoplastic resin layer upon heat sealing.

Additives such as a slip agent, an antistatic agent, an antifog additive, a UV absorber and an antioxidant and inorganic fillers such as silica and titanium oxide may be added to the thermoplastic resin to such range that the adhesiveness thereof to the substrate is not hindered.

Two or more thermoplastic resins may be laminated by co-extrusion.

Alternatively, another plastic film may be laminated on the thermoplastic resin layer.

Figure 1:
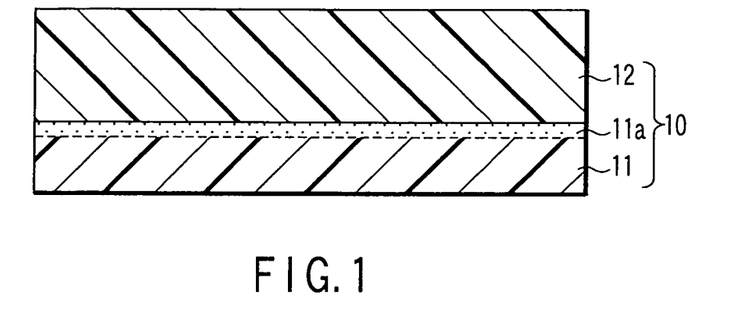
FIG. 1 is a cross-sectional view of a laminate in one embodiment of the present invention.

FIG. 1 shows a cross-sectional view of a laminate 10 according to one embodiment of the present invention. As shown in FIG. 1, a treated region 11a subjected to RIE pretreatment is formed on at least one side of a substrate 11. A thermoplastic resin layer 12 is extrusion-laminated on the treated region 11a of the surface of the substrate 11 subjected to RIE pretreatment.

When the laminate of the present invention is subjected to peeling while penetrating water into the gap between the RIE-pretreated substrate 11 and the thermoplastic resin layer 12, the substrate 11 itself causes cohesion failure in the treated region 11a, thereby advancing peeling. Such peeling occurs because of the excellent adhesion between the substrate 11 and the thermoplastic resin layer 12, showing that strong laminate strength is attained between the substrate and the thermoplastic resin layer. On the other hand, when the substrate 11 is not subjected to RIE pretreatment, interlaminar peeling occurs between the substrate 11 and the thermoplastic resin layer 12, showing that very weak laminate strength is merely obtained.

As to the substrate of the laminate of the present invention, the types and density of atoms in a region to several nm in depth from the surface of the substrate to be measured, and the bonding state of the atoms, can be analyzed by measurement with X-ray photoelectron spectroscopy (XPS), and the ratio of elements, the ratio of functional groups, and the like, can be determined.

Figure 2:
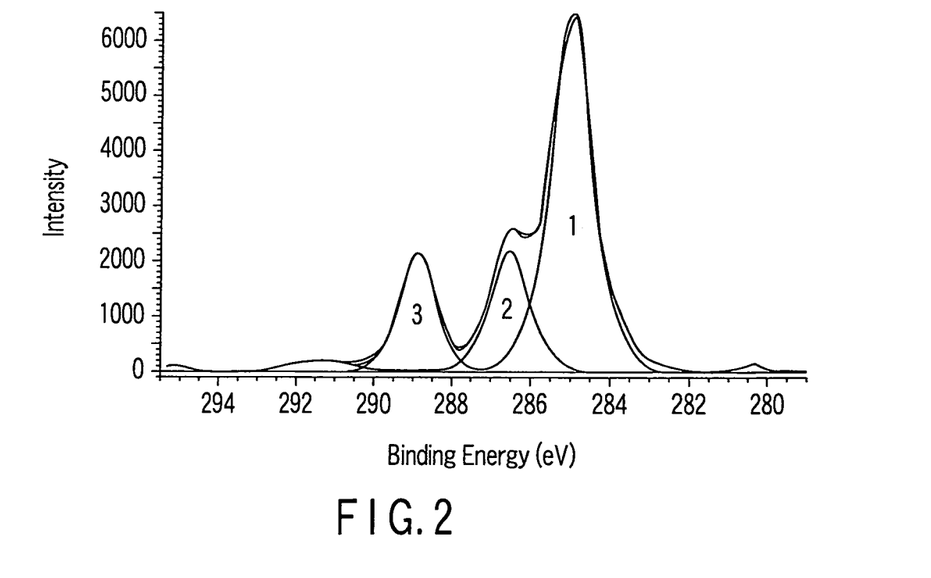
FIG. 2 is a separated analytic spectrum of C1s waveform of an untreated PET film obtained by XPS.

FIG. 2 is one example of a peak separated analytic spectrum of C1s waveform of the surface of a polyethylene phthalate (PET) film obtained by X-ray photoelectron spectroscopy (X-ray source, MgKα; output power, 100 W) where a PET film is used as a plastic film substrate in the laminate of the present invention. The C1s waveform is separated into C—C bond (1), C—O bond (2), and COO bond (3). The respective binding energies are 285.0 eV (C—C bond), 286.6 to 286.7 eV (C—O bond), and 288.9 to 289.0 eV (COO bond).

When the surface of the PET film after pretreatment by RIE in the present invention is measured, the film is desirably in such a surface state that the element ratio (O/C) is 0.49 or less, preferably 0.20 to 0.49, and/or the functional group ratio (COO/C—C) determined from C1s waveform separation is 0.33 or less, preferably 0.05 to 0.33, and/or the half width of C—C bond is 1.340 to 1.560 eV. When PET used as the substrate is in such a surface state, the substrate can exhibit extremely excellent adhesiveness upon extrusion lamination with a thermoplastic resin. When values indicative of the surface state are outside of the above ranges, the above-mentioned chemical and physical effects by the RIE treatment cannot be sufficiently attained thus deteriorating the adhesion of the substrate to the thermoplastic resin layer to make the product hardly usable.

Figure 3:
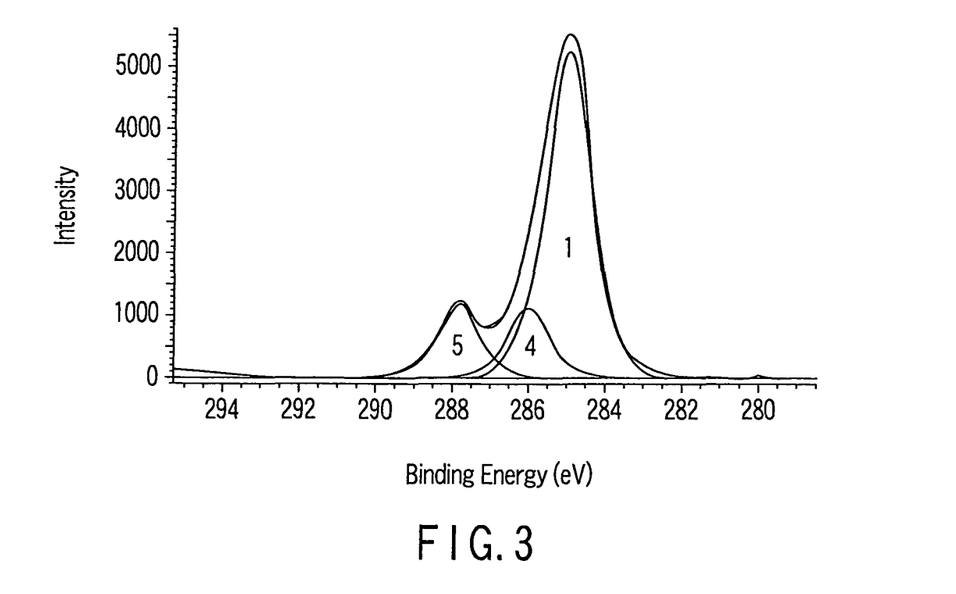
FIG. 3 is a separated analytic spectrum of C1s waveform of an untreated Ny film obtained by XPS.

FIG. 3 is one example of a peak separated analytic spectrum of C1s waveform of the surface of a polyamide (Ny) film obtained by X-ray photoelectron spectroscopy (X-ray source, MgKα; output power, 100 W) where an Ny film is used as a plastic film substrate in the laminate of the present invention. The C1s waveform is separated into C—C bond (1), C—N bond (4), and NHC=O bond (5). The respective binding energies are 285.0 eV (C—C bond), 286.6 to 286.7 eV (C—O bond), and 288.0 eV (NHC=O bond).

When the surface of the polyamide (Ny) film after pretreatment by RIE in the present invention is measured, the film is desirably in such a surface state that the element ratio (O/(C+N)) is 0.2 or more, and/or the half width of C—C bond is 1.380 to 1.560 eV. When values indicative of the surface state are outside of the above ranges, the adhesion of the substrate to the thermoplastic resin layer is made poor to make the product hardly usable.

Figure 4:
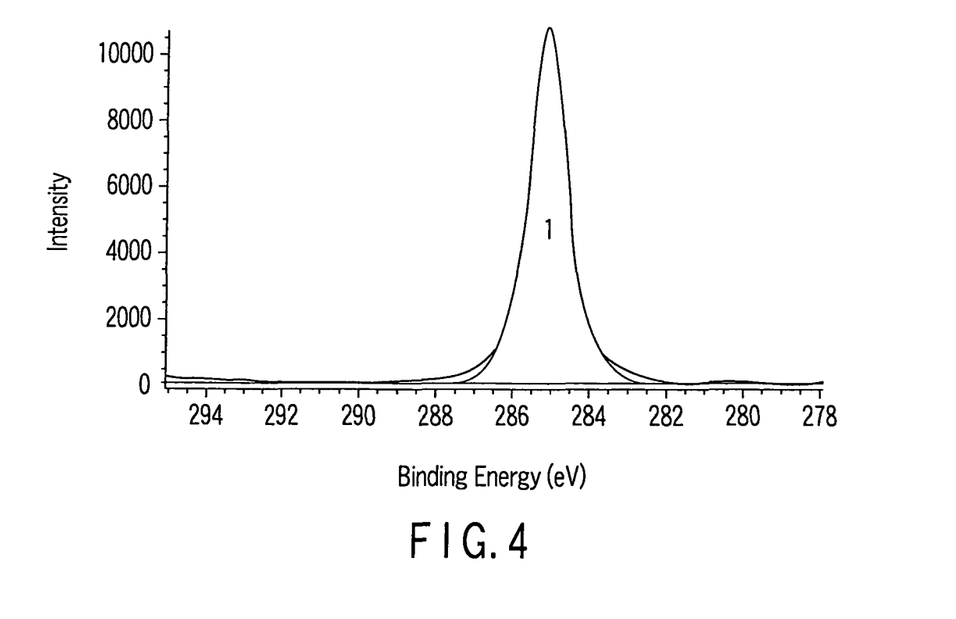
FIG. 4 is a separated analytic spectrum of C1s waveform of an untreated PP film obtained by XPS.

FIG. 4 is one example of a peak separated analytic spectrum of C1s waveform of the surface of a polypropylene (PP) film obtained by X-ray photoelectron spectroscopy (X-ray source, MgKα; output power 100 W) where a PP film is used as a plastic film substrate in the laminate of the present invention. The C1s waveform is C—C bond (1) only. The binding energy is 285.0 eV.

When the surface of the polypropylene (PP) film after pretreatment by RIE in the present invention is measured, the film is desirably in such a surface state that the element ratio (O/C) is 0.03 to 0.135, and/or the half width of C—C bond is 1.320 to 1.600 eV. When values indicative of the surface state are outside of the above ranges, the adhesion of the substrate to the thermoplastic resin layer is made poor to make the product hardly usable.

The laminate of the present invention can be disposed as an outermost layer or an interlayer for use in various packaging materials. Hereinafter, four examples of the structure of the packaging material will be described. Particularly when the laminate of the present invention is used as an interlayer with thermoplastic resin layers extrusion-laminated on both sides thereof as shown in the following (ii) or (iii), the above-mentioned treated surface is formed on one side of the substrate, and an anchor coating (AC) layer is arranged on the other side, and thus lamination can be carried out without using special facilities, and the steps can be simplified and the cost of the packaging material can be reduced.

(i) Substrate (RIE-treated surface)/thermoplastic resin layer/linear low-density polyethylene (LLDPE) layer;

(ii) PET/AC/thermoplastic resin layer/(RIE-treated surface) substrate/AC/thermoplastic resin layer/linear low-density polyethylene (LLDPE) layer;

(iii) OPP/AC/thermoplastic resin layer/(RIE-treated surface) substrate/AC/thermoplastic resin layer/low-density polypropylene (CPP) layer; and (iv) PET/ink/AC/MAH-grafted PP/(treated surface) PET/deposited layer/gas barrier coating layer (treated surface)/MAH-grafted PP/CPP.

The laminate according to another embodiment of the present invention is a laminate wherein a substrate has both a substrate body of a plastic film and a water-soluble polymer-containing gas barrier coating layer disposed on at least one side of the substrate body, and the surface of the gas barrier coating layer is subjected to pretreatment by plasma treatment, and the pretreated surface is laminated with the above-mentioned thermoplastic resin.

For example when a surface of the water-soluble polymer-containing gas barrier coating layer in this laminate is measured by X-ray photoelectron spectroscopy (XPS), the functional group ratio D (C—OH/C—C) of the carbon-hydroxyl group bond (C—OH) to the carbon-carbon bond (C—C) in the water-soluble polymer is preferably 0.25 or more to 0.87 or less.

An inorganic oxide-deposited layer with a thickness of 5 to 100 nm may be disposed between the substrate body and the gas barrier coating layer.

Figure 5:
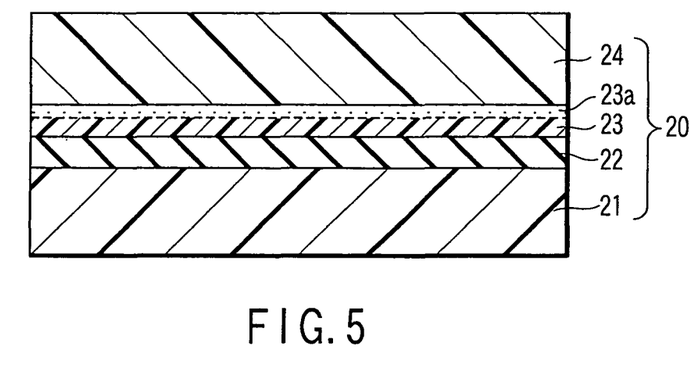
FIG. 5 is a cross-sectional view of a laminate in another embodiment of the present invention.

FIG. 5 shows a cross-sectional view of a laminate 20 in another embodiment of the present invention. As shown in FIG. 5, an inorganic oxide-deposited layer 22 and a gas barrier coating layer 23 are formed successively on at least one side of a substrate body 21, to form a substrate (gas barrier film). A treated region 23a subjected to pretreatment by plasma treatment or corona discharge treatment is formed on the surface of the gas barrier coating layer 23. A thermoplastic resin layer 24 is formed on the treated region 23a of the gas barrier coating layer 23. The respective layers described above may be formed on both sides of the substrate body 21. Each of the layers described above may be formed as a multilayer.

The description of the above substrate of a plastic film can apply to the substrate body 21.

For imparting gas barrier properties to the substrate body 21, the inorganic oxide-deposited layer 22 may be formed as necessary. The inorganic oxide-deposited layer may be a layer of a deposited layer of an inorganic oxide such as aluminum oxide, silicon oxide, tin oxide, magnesium oxide or a mixture thereof, having transparency and having gas barrier properties against oxygen and water vapor. Among those described above, aluminum oxide and silicon oxide are used more preferably in consideration of resistance to thermal sterilization. However, the deposited layer in the present invention is not limited to layers of the above-mentioned inorganic oxides, and any materials in accordance with the above conditions may be used.

The optimum thickness of the inorganic oxide-deposited layer 22 varies depending on the type and constitution of the inorganic oxide used, but is generally desirably in the range of 5 to 300 nm and is suitably selected in this range. When the film thickness is less than 5 nm, a uniform film may not be obtained, the film thickness may not be sufficient, and the film cannot sufficiently exhibit functions as a gas barrier material. When the film thickness exceeds 300 nm, the film cannot be provided with flexibility and may be cracked due to external factors such as bending, stretching, and the like, after deposition. The thickness of the inorganic oxide-deposited layer 22 is more preferably in the range of 10 to 150 nm.

There are various methods for forming the inorganic oxide-deposited layer 22 on the plastic substrate body 21. For example, the usual vacuum evaporation can be used. Other thin-film forming methods such as sputtering, ion plating and plasma chemical vapor deposition (CVD) can also be used. However, the vacuum evaporation is most superior at present in consideration of productivity. As heating means for the vacuum evaporation, an electron beam heating system, a resistance heating system or an induction heating system is preferably used, but in consideration of selectability from a wide variety of evaporation materials, an electron beam heating system is used more preferably. A plasma-assisted method and an ion beam-assisted method may be used in deposition to improve the adhesiveness between the deposited layer and the substrate and to improve the fineness of the deposited layer. For improving the transparency of the deposited layer, reactive deposition that involves blowing various gases such as oxygen to improve the transparency of the deposited layer may be used.

For enhancing the adhesion between the substrate body 21 and the inorganic oxide-deposited layer 22, the surface of the substrate body 21 may be subjected to surface treatment such as plasma treatment, corona treatment, and the like, and an anchor coating layer may be disposed between the substrate body 21 and the inorganic oxide-deposited layer 22. By disposing these layers, the laminate as a gas barrier film can have resistance to heating in retort treatment and boiling treatment, and usability of the film can be increased.

The gas barrier coating layer 23 is formed on the substrate body 21 (or the inorganic oxide-deposited layer 22). The gas barrier coating layer 23 may be constituted so as to contain a polymer resin such as polyvinyl alcohol, an ethylene-vinyl alcohol copolymer, polyester or an acrylic resin, or a polymer resin containing another compound. The gas barrier coating layer is generally formed by coating such polymer resin dissolved in a solvent.

Specifically, the gas barrier coating layer 23 is preferably a water-soluble polymer, and the water-soluble polymer includes polyvinyl alcohol, polyvinyl pyrrolidone, starch, methyl cellulose, carboxymethyl cellulose and sodium alginate. Particularly, polyvinyl alcohol (PVA) is preferable because it brings about the best gas barrier properties.

The gas barrier coating layer 23 may contain an inorganic compound. This inorganic compound includes hydrolysis products of one or more metal alkoxides. The metal alkoxides are compounds represented by the general formula: $M(OR)_n$ (M: a metal such as Si, Ti, Al or Zr, R: an alkyl group such as $CH_3$ or $C_2H_5$). Among these compounds, tetraethoxysilane $[Si(OC_2H_5)_4]$ and triisopropoxyaluminum $[Al(O-iso-C_3H_7)_3]$ are preferable because they are relatively stable in an aqueous solvent after hydrolysis.

Specifically, the gas barrier coating layer 23 is formed by preparing a solution having the water-soluble polymer dissolved in water or in a mixed solvent of water/alcohol and optionally containing a metal alkoxide or a previously hydrolyzed metal alkoxide, then applying the solution to the substrate body 21 (or the inorganic oxide layer 22), and drying it by heating. Known additives such as an isocyanate compound, a silane coupling agent, a dispersing agent, a stabilizer, a viscosity regulating agent and a colorant may be added as necessary to the above solution in such a range that the gas barrier properties are not deteriorated.

When PVA is used as the water-soluble polymer, the ratio of PVA in terms of weight ratio is preferably in the range of 20 wt % or more to 50 wt % or less, more preferably 25 wt % or more to 45 wt % or less, based on the total solid content of the mixed solution. When PVA is lower than 20 wt %, the flexibility of the film is deteriorated thus making formation of a gas barrier coating layer difficult. A PVA content of larger than 50 wt % is not preferable because the laminate as a gas barrier film cannot be provided with sufficient gas barrier properties.

When a silane coupling agent is added to the mixed solution for forming the gas barrier coating layer 23, the water resistance of the gas barrier coating layer 23 can be improved, and the laminate as a gas barrier film can be provided with more excellent heat resistance and can further prevent deterioration in gas barrier properties at high temperature under high humidity. Use of a silane coupling agent having an organic functional group selected from a vinyl group, an epoxy group, a methacryloxy group, an ureido group and an isocyanate group can further improve water resistance because the functional group is hydrophobic.

The silane coupling agent in terms of weight ratio after hydrolysis is preferably 12 wt % or less based on the total solid content of the mixed solution. The total amount of PVA and the silane coupling agent is preferably 20 wt % or more to 50 wt % or less based on the total solid content of the mixed solution. A large amount of the silane coupling agent is not preferable because the resulting gas barrier coating layer fails to exhibit its functions.

When a thermoplastic resin layer is to be disposed at the side of the deposited layer, a gas barrier coating layer 23 is formed on the deposited layer and then subjected thereon to plasma treatment, to form a treated region 23a on the surface thereof. When such surface treatment is carried out, new functional groups can be introduced onto the treated region 23a on the surface of the gas barrier coating layer 23, to improve the adhesion to a thermoplastic resin. The plasma treatment includes various modes such as atmospheric-pressure plasma treatment, low-temperature plasma treatment (that is, reactive ion etching treatment) and ion bombardment treatment, but the method is not particularly limited insofar as the surface state shown below is attained by the treatment. Various treatment conditions can be suitably established depending on each of the treatment methods.

Figure 6:
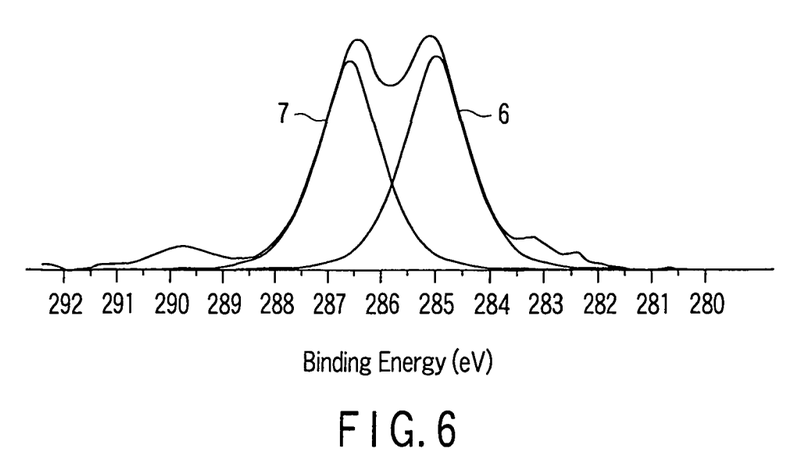
FIG. 6 is a separated analytic spectrum of C1s waveform of a PVA-containing gas barrier coating layer obtained by XPS.

FIG. 6 is one example of a peak separated analytic spectrum of C1s waveform of the surface of a gas barrier coating layer using PVA as the water-soluble polymer by measurement with X-ray photoelectron spectroscopy (XPS). The measurement was carried out with MgKα as an X-ray source with an output power of 100 W. The C1s waveform is separated into C—C bond peak (6) and C—OH bond peak (7). The respective binding energies are in the vicinity of 285.0 eV (C—C bond) and in the vicinity of 286.5 eV (C—OH bond). From the peak strength of C—C bond and C—OH bond, the functional group ratio D (C—OH/C—C) is determined. In the laminate as a gas barrier film in the present invention, the functional group ratio D (C—OH/C—C) of the C—OH bond to the C—C bond in the water-soluble polymer in the gas barrier coating layer is preferably 0.25 or more to 0.87 or less. When the functional group ratio D is lower than 0.25, the treatment of the surface proceeds too excessively, thus causing not only a reduction in adhesiveness but also a deterioration in the functions of the gas barrier coating layer. When the functional group ratio D is higher than 0.87, the effect of the treatment is low, so any functional groups are not introduced and sufficient adhesion cannot be obtained.

When the ratio $D/D^0$ of the functional group ratio D of the gas barrier coating layer 23 after pretreatment to the functional group ratio $D^0$ thereof before pretreatment is 0.30 or more to 0.92 or less, the adhesion between the gas barrier coating layer 23 and the thermoplastic resin layer becomes stronger. When $D/D^0$ is outside of the above range, an effect of improving adhesiveness cannot be obtained for the same reason as described above.

When the thermoplastic resin layer 24 is laminated by extrusion lamination onto the gas barrier coating layer 23 having the surface described above, the adhesiveness between the gas barrier coating layer 23 and the thermoplastic resin layer 24 is improved. The thermoplastic resin is not particularly limited insofar as it is capable of lamination, and as described above, the thermoplastic resin includes resins such as a low-density polyethylene resin, a high-density polyethylene resin, a medium-density polyethylene resin, an ethylene-vinyl acetate copolymer, an ethylene-α-olefin copolymer, an ethylene-α,β-unsaturated carboxylic acid copolymer and its esterified product or ionic crosslinked product, a polypropylene resin, a propylene-α-olefin copolymer, an acid anhydride-modified polyolefin, and an epoxy-modified polyolefin. These resins may be used alone or as a blend of two or more thereof.

The extrusion temperature at the time of lamination and the thickness of the thermoplastic resin layer are also the same as described above. The additives are also the same as described above. Two or more thermoplastic resins may be laminated by co-extrusion, or another plastic film may be laminated on the thermoplastic resin layer.

EXAMPLES

Hereinafter, the laminate of the present invention will be described in more detail with reference to the Examples. It should be noted that the present invention is not limited to these examples.

Example 1

An untreated surface of a polyethylene terephthalate (PET) film of 12 μm in thickness was subjected to pretreatment with reactive ion etching (RIE) under the following conditions. A high-frequency power source with a frequency of 13.56 MHz was used for the electrodes.
[Plasma Treatment Conditions]
Applied electric power: 120 W
Treatment time: 0.1 sec
Treatment gas: argon
Treatment unit pressure: 2.0 Pa The self-bias value was 450 V, and the Ed value was 210 $W \cdot m^{-2} \cdot s$. Low-density polyethylene (LDPE) was extrusion-laminated onto the treated surface at an extrusion temperature of 320° C. to form a film of 15 μm in thickness, whereby a laminate was obtained. As a sandwich substrate, linear low-density polyethylene (LLDPE) film of 60 μm in thickness was further laminated thereon.

Example 2

A laminate was prepared in the same manner as in Example 1 except that the treatment time in RIE pretreatment was 0.5 s. The self-bias value was 450 V, and the Ed value was 430 $W \cdot m^{-2} \cdot s$.

Example 3

A laminate was prepared in the same manner as in Example 1 except that the applied electric power in RIE pretreatment was 500 W. The self-bias value was 900 V, and the Ed value was 900 $W \cdot m^{-2} \cdot s$.

Example 4

A laminate was prepared in the same manner as in Example 1 except that a polypropylene (PP) resin was extrusion-laminated at an extrusion temperature of 290° C.

Example 5

A laminate was prepared in the same manner as in Example 1 except that a PET film was not pretreated.

Example 6

A laminate was prepared in the same manner as in Example 1 except that a PET film was subjected to corona treatment instead of RIE pretreatment.

Example 7

An untreated surface of a polyamide (Ny) film of 15 μm in thickness was subjected to pretreatment with reactive ion etching (RIE) under the following conditions. A high-frequency power source with a frequency of 13.56 MHz was used for the electrodes.
[Plasma Treatment Conditions]
Applied electric power: 120 W
Treatment time: 0.1 sec
Treatment gas: argon
Treatment unit pressure: 2.0 Pa The self-bias value was 450 V, and the Ed value was 210 $W \cdot m^{-2} \cdot s$. Low-density polyethylene (LDPE) was extrusion-laminated onto the treated surface at an extrusion temperature of 320° C. to form a film of 15 μm in thickness, whereby a laminate was obtained. As a sandwich substrate, linear low-density polyethylene (LLDPE) film of 60 μm in thickness was laminated thereon.

Example 8

A laminate was prepared in the same manner as in Example 7 except that the treatment time in RIE pretreatment was 0.5 s. The self-bias value was 450 V, and the Ed value was 430 $W \cdot m^{-2} \cdot s$.

Example 9

A laminate was prepared in the same manner as in Example 7 except that a polypropylene (PP) resin was extrusion-laminated at an extrusion temperature of 290° C.

Example 10

A laminate was prepared in the same manner as in Example 7 except that a Ny film was not pretreated.

Example 11

A laminate was prepared in the same manner as in Example 7 except that a Ny film was subjected to corona treatment instead of RIE pretreatment.

Example 12

An untreated surface of a polypropylene (PP) film of 20 μm in thickness was subjected to pretreatment with reactive ion etching (RIE) under the following conditions. A high-frequency power source with a frequency of 13.56 MHz was used for the electrodes.
[Plasma Treatment Conditions]
Applied electric power: 200 W
Treatment time: 0.2 sec
Treatment gas: argon
Treatment unit pressure: 2.0 Pa The self-bias value was 550 V, and the Ed value was 700 $W \cdot m^{-2} \cdot s$. Low-density polyethylene (LDPE) was extrusion-laminated onto the treated surface at an extrusion temperature of 320° C. to form a film of 15 μm in thickness, whereby a laminate was obtained. As a sandwich substrate, linear low-density polyethylene (LLDPE) film of 60 μm in thickness was laminated thereon.

Example 13

A laminate was prepared in the same manner as in Example 12 except that the treatment time in RIE pretreatment was 0.5 s. The self-bias value was 550 V, and the Ed value was 1800 $W \cdot m^{-2} \cdot s$.

Example 14

A laminate was prepared in the same manner as in Example 12 except that a PP film was not pretreated.

Example 15

A laminate was prepared in the same manner as in Example 12 except that a PP film was subjected to corona treatment instead of RIE pretreatment.

[Method of Analyzing Surface State]

Before extrusion lamination of the thermoplastic resin onto the substrate in Examples 1 to 15, the surface pretreated with RIE was analyzed by X-ray photoelectron spectroscopy. The X-ray photoelectron spectroscopic instrument used in this measurement was JPS-90MXV manufactured by JEOL, and the pretreated surface was measured with a non-monochromatic MgKα as an X-ray source (1253.6 eV) with an output power of 100 W (10 kV-10 mA). In quantitative analysis, relative sensitivity factors of 2.28 for O1s, 1.00 for C1s and 1.61 for N1s were used in calculation, to determine the O ratio (O/C or O/(C+N)) as the element ratio. In the waveform separated analysis of C1s waveform, a mixed function of Gaussian function and Lorentz function was used, and electrification correction was carried out with a C—C bond peak attributable to benzene ring as 285.0 eV.

[Laminate Strength]

Each of the laminates in Examples 1 to 15 was examined for its laminate strength between the film substrate and the laminated thermoplastic resin layer with Tensilon Universal Tester RTC-1250 manufactured by Orientec Co., Ltd. (in accordance with JIS Z1707). In this measurement, the measurement site was wetted with water and peeled. The angle of peeling was 180°. The results are shown in Table 1. Whether the peeled face of the sample after measurement of laminate strength was a face of the substrate or a face between layers was confirmed by measurement with X-ray photoelectron spectroscopy.

electron beam heating in a vacuum evaporation apparatus, and an oxygen gas was introduced into the apparatus to form aluminum oxide of 15 nm in thickness. This aluminum oxide was coated by gravure coating with a solution in which the following solutions A and B had been mixed in a mixing ratio (wt %) of 60/40, followed by drying to form a gas barrier coating layer of 0.3 μm in thickness, whereby a gas barrier film was prepared.

Solution A: A hydrolysis solution with a solid content of 3 wt % (in terms of $SiO_2$) prepared by adding 89.6 g (0.1 N) hydrochloric acid to 10.4 g tetraethoxy-silane and then hydrolyzing the silane under stirring for 30 minutes.

Solution B: A 3 wt % polyvinyl alcohol solution in water/isopropyl alcohol (water to isopropyl alcohol ratio was 90 to 10 by weight).

Then, the gas barrier coating layer was subjected to plasma treatment with reactive ion etching (RIE) under the conditions of an applied electric power of 120 W and plasma density E=400 W·s/m$^2$. As the treatment gas, an argon/oxygen mixed gas was used, the treatment unit pressure was 2.0 Pa, and the self-bias value was 450 V.

This gas barrier coating layer was extrusion-laminated with low-density polyethylene (LDPE) of 15 μm in thickness at an extrusion temperature of 320° C. to give a laminate. As a sandwich substrate, linear low-density polyethylene (LLDPE) film of 60 μm in thickness was further laminated thereon.

TABLE 1

| | Self-bias value (V) | Ed value (W·m$^{-2}$·sec) | Element ratio | COO/C—C | C—C half width (eV) | Wet laminate strength (N/15 mm) | Peeled face* |
|---|---|---|---|---|---|---|---|
| Example 1  | 450 | 210  | 0.46  | 0.32 | 1.38 | 3.0 | Substrate |
| Example 2  | 450 | 430  | 0.47  | 0.30 | 1.49 | 3.5 | Substrate |
| Example 3  | 900 | 900  | 0.46  | 0.24 | 1.56 | 3.8 | Substrate |
| Example 4  | 450 | 210  | 0.46  | 0.32 | 1.38 | 4.2 | Substrate |
| Example 5  | 450 | 0    | 0.51  | 0.34 | 1.25 | 0.5 | Interlayer |
| Example 6  | 450 | 0    | 0.56  | 0.38 | 1.30 | 0.7 | Interlayer |
| Example 7  | 450 | 210  | 0.22  | —    | 1.40 | 2.5 | Substrate |
| Example 8  | 450 | 430  | 0.23  | —    | 1.43 | 3.2 | Substrate |
| Example 9  | 450 | 210  | 0.22  | —    | 1.40 | 3.8 | Substrate |
| Example 10 | 450 | 0    | 0.16  | —    | 1.35 | 0.3 | Interlayer |
| Example 11 | 450 | 0    | 0.18  | —    | 1.35 | 0.4 | Interlayer |
| Example 12 | 550 | 700  | 0.11  | —    | 1.55 | 5.5 | Substrate |
| Example 13 | 550 | 1800 | 0.05  | —    | 1.52 | 6.0 | Substrate |
| Example 14 | 550 | 0    | 0.005 | —    | 1.10 | 0.1 | Interlayer |
| Example 15 | 550 | 0    | 0.14  | —    | 1.30 | 0.3 | Interlayer |

*Peeled face: "Substrate" means peeling through cohesion failure of the substrate;
"Interlayer" means peeling between the substrate and the thermoplastic resin.

It can be seen that the adhesion between the substrate and the thermoplastic resin in Examples 1 to 4 is superior to that in Examples 5 and 6 for comparison. Similarly, it can be seen that the adhesion between the substrate and the thermoplastic resin in Examples 7 to 9 is superior to that in Examples 10 and 11 for comparison, and also that the adhesion between the substrate and the thermoplastic resin in Examples 12 and 13 is superior to that in Examples 14 and 15 for comparison. According to the present invention, the laminate excellent in the adhesion between the plastic substrate and the thermoplastic resin can thus be provided without coating the substrate with an anchor coating agent and without ozonation of the thermoplastic resin at the time of extrusion.

Example 21

Metal aluminum was deposited on one side of a polyethylene terephthalate (PET) film of 12 μm in thickness by Example 22

A laminate was prepared in the same manner as in Example 21 except that the gas barrier coating layer was subjected to plasma treatment with ion bombardment under the conditions of an applied electric power of 1200 W and plasma density E=1700 W·s/m$^2$, an argon gas was used as the treatment gas, and the treatment unit pressure was 0.4 Pa.

Example 23

In the same manner as in Example 21, metal aluminum was deposited on one side of a polyethylene terephthalate (PET) film of 12 μm in thickness by electron beam heating in a vacuum evaporation apparatus, and an oxygen gas was introduced into the apparatus to form aluminum oxide of 15 nm in thickness. This aluminum oxide was coated by gravure coating with a solution wherein the following solutions A, B and C had been mixed in a mixing ratio (wt %) of 70/25/5, followed by drying to form a gas barrier coating layer of 0.3 μm in thickness, whereby a gas barrier film was prepared.

Solution A: A hydrolysis solution with a solid content of 3 wt % (in terms of $SiO_2$) prepared by adding 89.6 g (0.1 N) hydrochloric acid to 10.4 g tetraethoxy-silane and then hydrolyzing the silane under stirring for 30 minutes.

Solution B: A 3 wt % polyvinyl alcohol solution in water/isopropyl alcohol (water to isopropyl alcohol ratio was 90 to 10 by weight).

Solution C: A hydrolysis solution with a solid content adjusted to 5 wt % (in terms of $R^2Si(OH)_3$) prepared by gradually adding hydrochloric acid (1N) to β-(3,4-epoxycyclohexyl)trimethoxysilane and isopropyl alcohol (IPA solution), then hydrolyzing the silane under stirring for 30 minutes and hydrolyzing it in a water/IPA (1/1) solution.

Then, the gas barrier coating layer was subjected to plasma treatment with ion bombardment under the conditions of an applied electric power of 1200 W and plasma density E=1700 W·s/m². As the treatment gas, an argon gas was used, and the treatment unit pressure was 0.4 Pa.

This gas barrier coating layer was extrusion-laminated with low-density polyethylene (LDPE) of 15 μm in thickness at an extrusion temperature of 320° C. to give a laminate. As a sandwich substrate, linear low-density polyethylene (LLDPE) film of 60 μm in thickness was further laminated thereon.

Example 24

A laminate was prepared in the same manner as in Example 23 except that the gas barrier coating layer was subjected to plasma treatment with reactive ion etching (RIE) under the conditions of an applied electric power of 350 W and plasma density E=600 W·s/m², an oxygen gas was used as the treatment gas, the treatment unit pressure was 2.0 Pa, and the self-bias value was 650 V.

Example 25

A laminate was prepared in the same manner as in Example 21 except that the gas barrier coating layer was not subjected to plasma treatment.

Example 26

A laminate was prepared in the same manner as in Example 21 except that the gas barrier coating layer was subjected to corona discharge treatment under the conditions of an applied electric power of 1000 W and a discharge rate of 500 W·min/m².

Example 27

A laminate was prepared in the same manner as in Example 23 except that the gas barrier coating layer was not subjected to plasma treatment.

Example 28

A laminate was prepared in the same manner as in Example 23 except that the gas barrier coating layer was subjected to plasma treatment with reactive ion etching (RIE) under the conditions of an applied electric power of 10 W and plasma density E=15 W·s/m², in place of the plasma treatment in Example 23, an argon/oxygen mixed gas was used as the treatment gas, the treatment unit pressure was 2.0 Pa, and the self-bias value was 100 V.

Example 29

A laminate was prepared in the same manner as in Example 28 except that the gas barrier coating layer was subjected to plasma treatment with reactive ion etching (RIE) under the conditions of an applied electric power of 250 W and plasma density E=1300 W·s/m², in place of the plasma treatment in Example 28, an argon/oxygen mixed gas was used as the treatment gas, the treatment unit pressure was 2.0 Pa, and the self-bias value was 650 V.

[Method of Analyzing Surface State]

Before and after the pretreatment of the gas barrier coating layer in Examples 21 to 29, the surface of the gas barrier coating layer was analyzed by X-ray photoelectron spectroscopy. The X-ray photoelectron spectroscopic instrument used in this measurement was JPS-90MXV manufactured by JEOL, and the surface was measured with a non-monochromatic MgKα as an X-ray source (1253.6 eV) with an output power of 100 W (10 kV-10 mA). In the waveform separated analysis of C1s waveform, a mixed function of Gaussian function and Lorentz function was used, and electrification correction was carried out with a C—C bond peak as 285.0 eV. From the waveform separation analysis, the peak strengths of C—C bond and C—OH bond were determined. The functional group ratio $D^0$ (C—OH/C—C) before the pretreatment and the functional group ratio D (C—OH/C—C) after the pretreatment were determined. $D/D^0$ was also determined.

[Laminate Strength]

The laminates in Examples 21 to 29 were measured for their laminate strength according to a test method prescribed under Japanese Industrial Standards (JIS) K6854-3:1999 "Adhesive—Determination of peel strength of bonded assemblies—Part 3: T-Type peeling". In the test, Tensilon Universal Tester RTC-1250 manufactured by Orientec Co., Ltd., was used.

TABLE 2

|  | D(C—OH/C—C) | $D/D^0$ | Laminate strength (N/15 mm) | Adhesion evaluation |
|---|---|---|---|---|
| Example 21 | 0.73 | 0.75 | 1.5 | good |
| Example 22 | 0.55 | 0.58 | 2.0 | good |
| Example 23 | 0.45 | 0.50 | 1.0 | good |
| Example 24 | 0.26 | 0.32 | 1.1 | good |
| Example 25 | 0.98 | 1.0 | 0.05 | poor |
| Example 26 | 0.23 | 0.26 | 0.2 | medium |
| Example 27 | 0.89 | 1.0 | 0.02 | poor |
| Example 28 | 0.88 | 0.94 | 0.3 | medium |
| Example 29 | 0.23 | 0.28 | 0.05 | poor |

It can be seen that the adhesion between the gas barrier coating layer and the thermoplastic resin in Examples 21 to 24 is superior to that in Examples 25 to 29 for comparison. According to the present invention, the laminate excellent in the adhesion between the gas barrier coating layer and the thermoplastic resin can thus be provided without coating the gas barrier coating layer with an anchor coating agent and without ozonation of the thermoplastic resin at the time of extrusion.

Example 30

The gas barrier coating layer of the gas barrier film in Example 23 was similarly subjected to plasma treatment, and the polyethylene terephthalate surface of the substrate was also subjected to the same plasma treatment as in Example 1.

Separately, a polyethylene terephthalate film printed with a urethane-based two-component curing ink was prepared. The printed surface of this polyethylene terephthalate film was coated with a urethane two-component curing anchor coating agent and then extrusion-laminated with maleic anhydride-grafted polypropylene to form a film of 20 μm in thickness on the printed surface. The above gas barrier film subjected on both sides to plasma treatment was used as a sandwich substrate, and the above maleic anhydride-grafted polypropylene was laminated directly on the plasma-treated polyethylene terephthalate film, and the gas barrier coating without coating with an anchor coating agent was extrusion-laminated directly with a maleic anhydride-grafted polypropylene film of 20 μm in thickness. An unstretched polypropylene film prepared separately as a second sandwich substrate was extruded and laminated on the surface of the maleic anhydride-grafted polypropylene.

PET/ink/AC/MAH-grafted PP/(treated surface) PET/deposited layer/gas barrier coating layer (treated surface)/MAH-grafted PP/CPP Two sheets of the above laminate were arranged such that their CPP faces were opposed to each other, and the two sheets were sealed in their peripheral portion to produce a pouch which was then charged with water and sterilized in a retort. Retort conditions were 120° C., 120 minutes in a steam retort.

The laminate strength between MAH-grafted PP/(treated surface) PET was 2.4 N/15 mm before retort treatment and 1.5 N/15 mm after retort treatment, and the laminate strength between the gas barrier coating layer (treated surface)/MAH-grafted PP was 1.0 N/15 mm before retort treatment and 4.1 N/15 mm after retort treatment.

This measurement was carried out in a dry condition in a T-type peeling test.

The oxygen permeability was 0.38 cc/m$^2$·day before retort treatment and 0.45 cc/m$^2$·day after retort treatment. This measurement was carried out at 30° C. under 70% RH with a measuring instrument (model name, OXTRAN) manufactured by MOCON.

According to the present invention, there can be provided a laminate excellent in the adhesion between a substrate and a thermoplastic resin by using a plastic substrate subjected to pretreatment with plasma treatment even if the thermoplastic resin is extrusion-laminated directly on the substrate. The thermoplastic resin is not limited, so a general thermoplastic resin can be used, and the coating of the substrate with an anchor coating agent or the ozonation of the thermoplastic resin at the time of extrusion lamination is not necessary, and thus there can be brought about the great advantage of applicability to various packaging materials.

What is claimed is:

1. A method of manufacturing a laminate, comprising:
   providing a substrate of a polyethylene terephthalate film;
   forming an aluminum oxide layer on the substrate;
   coating the aluminum oxide layer with a gas barrier coating layer comprising polyvinyl alcohol and a hydrolysis product of at least one metal alkoxide;
   pretreating a surface of the gas barrier coating layer by plasma treatment using reactive ion etching or ion bombardment, the surface of the gas barrier coating layer being pretreated by plasma treatment such that a functional group ratio D (C—OH/C—C) of a carbon-hydroxyl group bond (C—OH) to a carbon-carbon bond (C—C) in the polyvinyl alcohol measured by X-ray photoelectron spectroscopy becomes 0.25 or more to 0.87 or less; and
   extrusion-laminating a low-density polyethylene film directly on the pretreated surface of the gas barrier coating layer.

2. The method according to claim 1, wherein the surface of the gas barrier coating layer is pretreated by plasma treatment such that a ratio $D/D^0$ of the functional group ratio D of the gas barrier coating layer after pretreatment to a functional group ratio $D^0$ thereof before pretreatment becomes 0.30 or more to 0.92 or less.

3. The method according to claim 1, wherein the aluminum oxide has a thickness of 5 to 100 nm.

4. The method according to claim 1, wherein the gas barrier coating layer further comprises a hydrolysis product of β-(3, 4-epoxycyclohexyl)trimethoxysilane.

* * * * *